Sept. 2, 1958  A. H. DICKINSON  2,850,240
ROTATIONAL DISPLACEMENT INDICATING SYSTEM
Filed Oct. 28, 1952  12 Sheets-Sheet 1

INVENTOR.
ARTHUR H. DICKINSON
BY Albert R. Hodges
ATTORNEY

Sept. 2, 1958  A. H. DICKINSON  2,850,240
ROTATIONAL DISPLACEMENT INDICATING SYSTEM
Filed Oct. 28, 1952  12 Sheets-Sheet 3

INVENTOR
ARTHUR H. DICKINSON
BY Albert R. Hodges
ATTORNEY

INVENTOR
ARTHUR H. DICKINSON
BY Albert R. Hodges
ATTORNEY

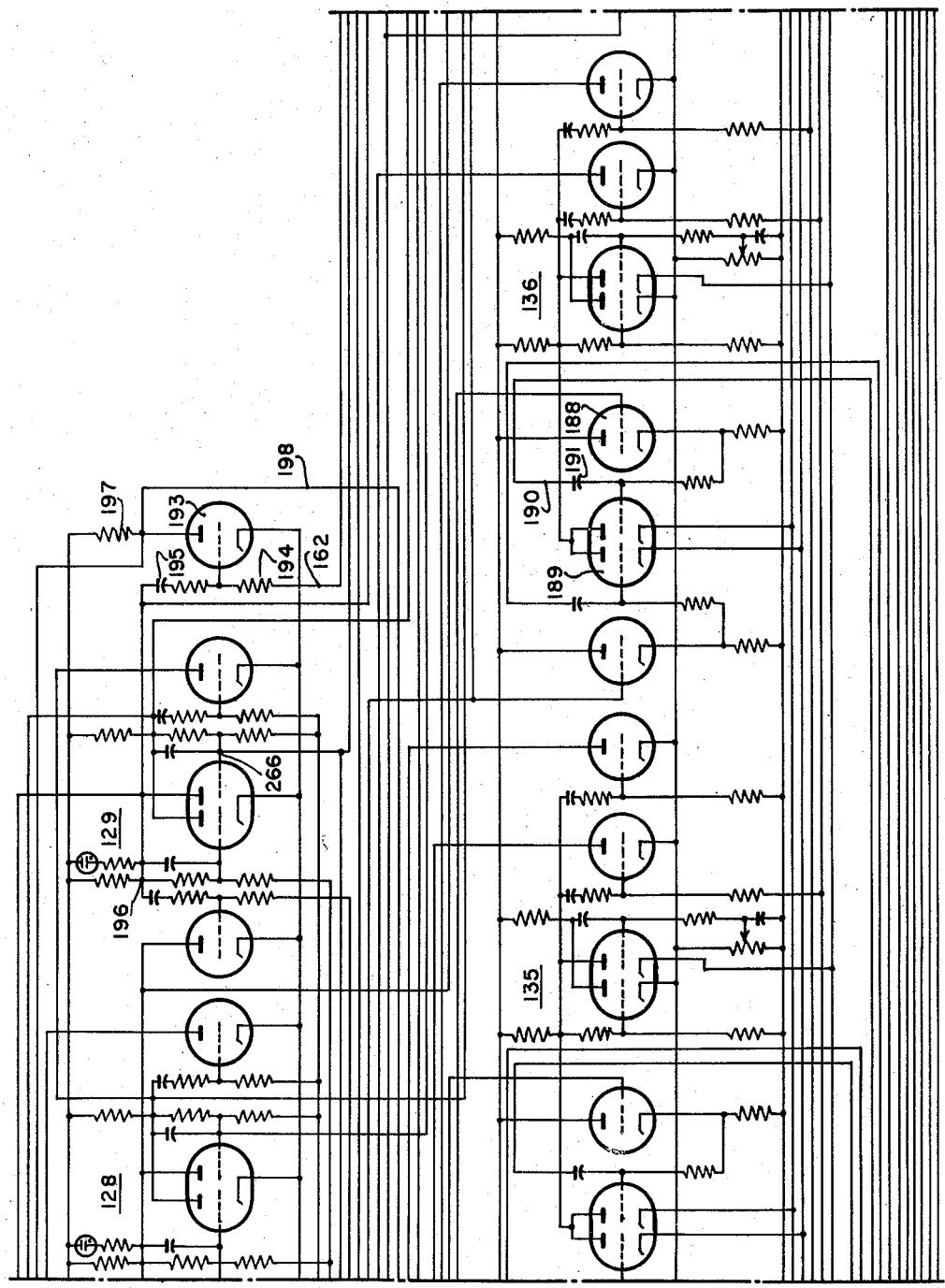

Sept. 2, 1958

A. H. DICKINSON 2,850,240

ROTATIONAL DISPLACEMENT INDICATING SYSTEM

Filed Oct. 28, 1952

INVENTOR
ARTHUR H. DICKINSON
BY
*Albert R. Hodges*
ATTORNEY

FIG. II

INVENTOR
ARTHUR H. DICKINSON
BY Albert R. Hodges
ATTORNEY

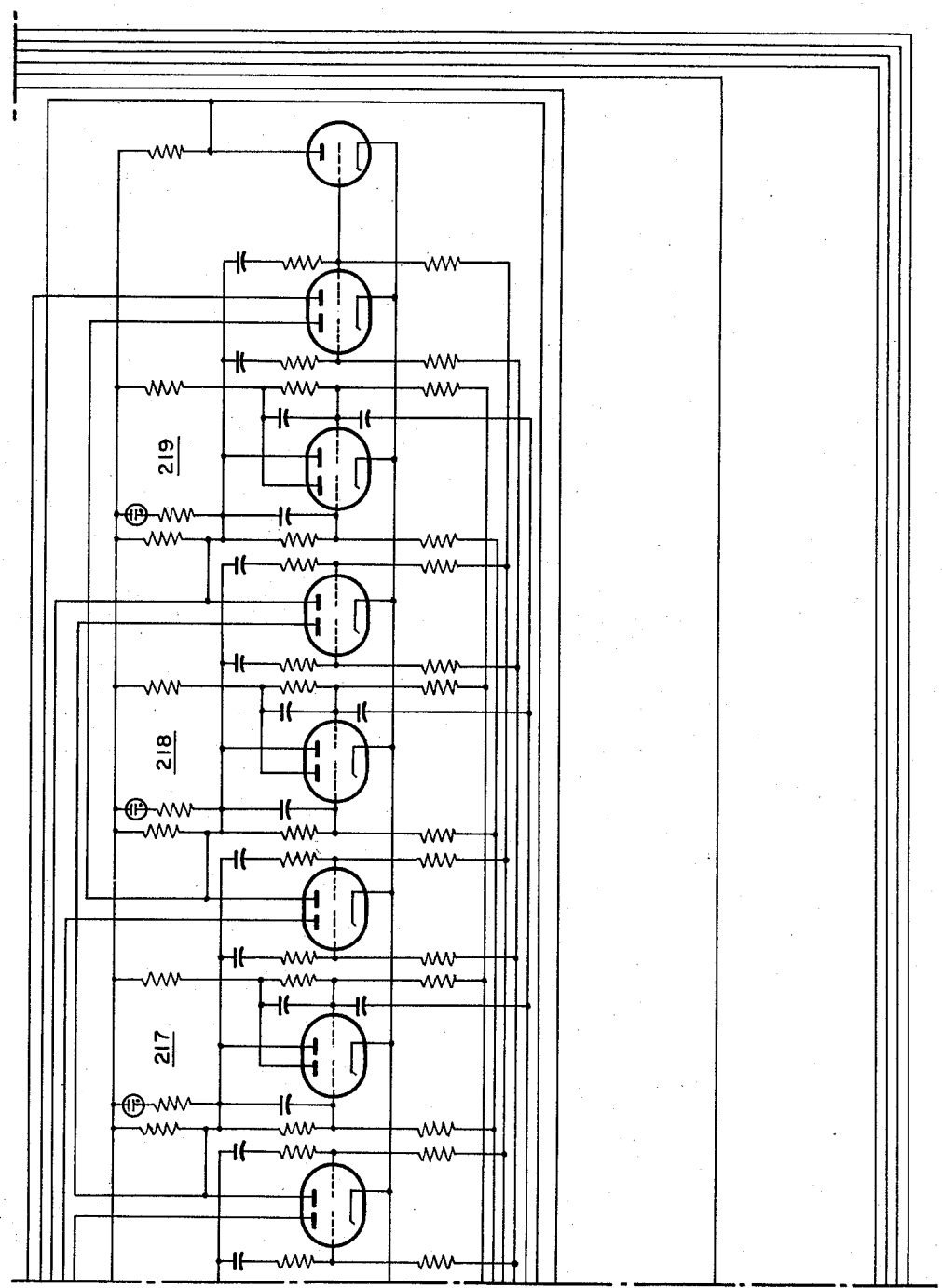

United States Patent Office 2,850,240
Patented Sept. 2, 1958

2,850,240

ROTATIONAL DISPLACEMENT INDICATING SYSTEM

Arthur H. Dickinson, Greenwich, Conn., assignor to International Business Machines Corporation, New York, N. Y., a corporation of New York Application October 28, 1952, Serial No. 317,197

20 Claims. (Cl. 235—92)

This invention relates to means for indicating the position or displacement of a movable member, and more particularly to arrangements for providing a digital representation of the rotational displacement of a rotatable member.

Previously known rotational position indicators have generally been characterized by one or more serious shortcomings which prevent their use in many applications. One of these shortcomings is an inability to operate over an extremely wide speed range, varying from substantially zero to a relatively high speed of rotation of the rotatable member or shaft under observation. Another disadvantage has been the lack of reversibility, so that the arrangement was suitable for use in indicating displacement in only one direction of rotation. Some prior-art arrangements were incapable of providing an indication of rotational displacement which comprised more than a single revolution. Still other arrangements placed a substantial load on the rotatable member, thus seriously limiting their application.

It is an object of the present invention, therefore, to provide an improved rotational displacement indicator which is capable of high accuracy and which overcomes the shortcomings of previously known devices.

Another object is to provide a rotational displacement indicator which operates equally well in either direction, and which is capable of operating over an extremely wide speed range.

A further object is to provide a rotational displacement indicator which places no appreciable loading upon the shaft under observation.

Still another object of the present invention is to provide an arrangement which permits the maximum utilization of the components, so that a relatively compact and inexpensive construction may readily be achieved.

In accordance with the present invention, there is provided apparatus for indicating the rotational displacement of a rotatable member comprising means controlled by a rotatable member for generating an electrical field adapted to traverse an index position, means responsive to the field for producing a distinctive signal when the field traverses the index position, and register means responsive to the signal for registering said field traversal. This apparatus preferably comprises a synchro generator having its rotor driven by the rotatable member and its rotor winding energized by a suitable source of alternating current. Synchro receiving means are provided having primary windings connected to the stator windings of the synchro generator and having a plurality of secondary windings fixedly positioned with different orientations. Also provided are discriminating means responsive respectively to the error voltages developed in the secondary windings to provide output pulses indicative of the presence and phase of the error voltages.

In accordance with an additional feature of the present invention, there are also provided means responsive to the discriminator output pulses for providing a digital indication of the rotational displacement of the rotatable member. Such means preferably comprises a register.

Other objects and features of the invention will be pointed out in the following description and claims and illustrated in the accompanying drawings, which disclose, by way of example, the principle of the invention and the best mode, which has been contemplated, of applying that principle.

In the drawings, in which like reference numerals designate like components:

Figure 3:
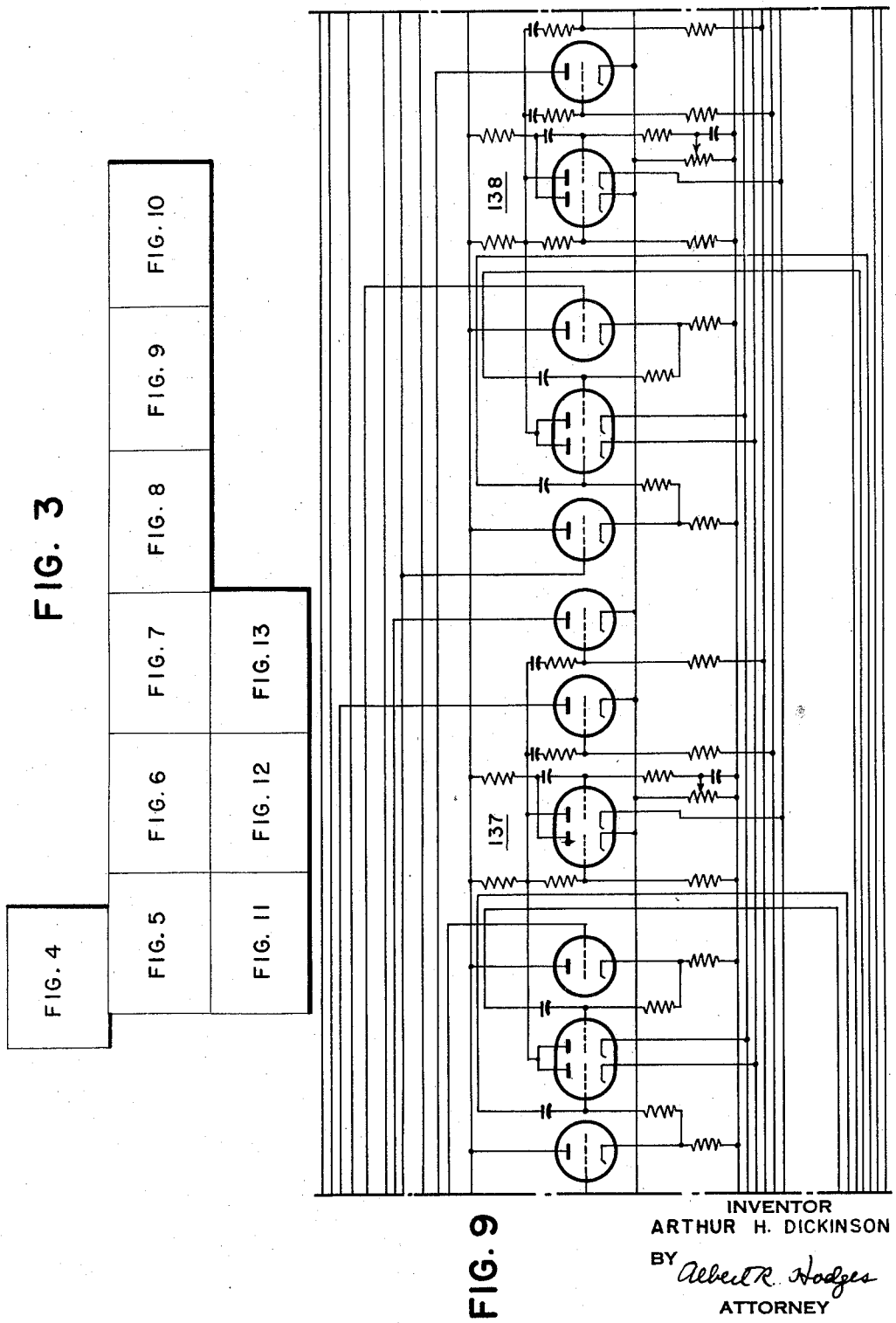
Fig. 3 is a diagram illustrating the relative positions of Figs. 4–13.

Figs. 4–13, taken together and arranged as shown in Fig. 3, comprise a schematic circuit diagram of a rotational displacement indicator in accordance with the present invention.

Figure 1:
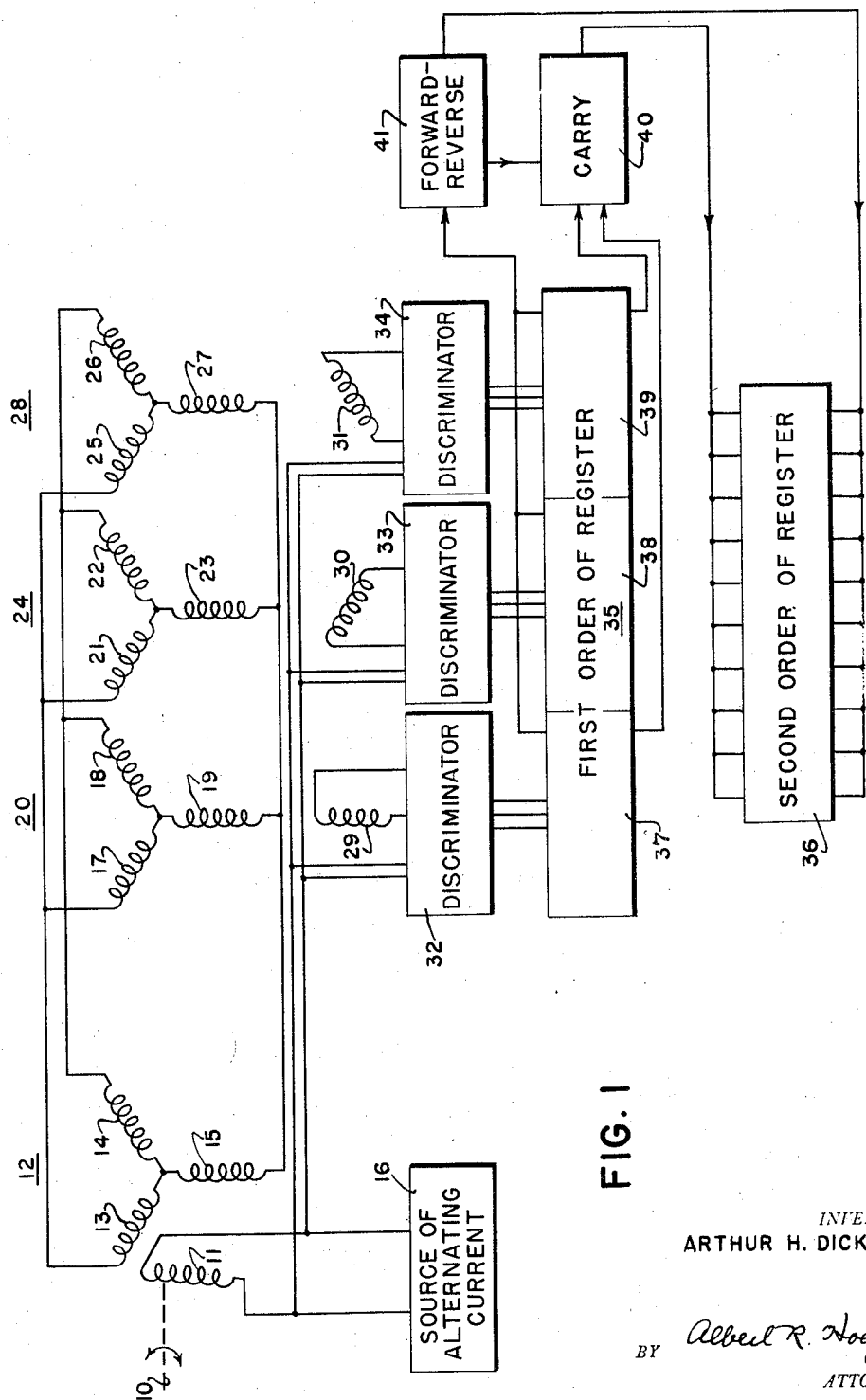
Fig. 1 is a schematic diagram, partly in block form, of an embodiment of the rotational displacement indicating device in accordance with the present invention.

Turning now to Fig. 1, there is shown a simple embodiment of the present invention which is capable of indicating ten shaft revolutions in either direction, the increment or unit of rotational measurement being one-third revolution. As shown in this figure, a shaft 10, comprising the rotatable member under observation, is arranged to drive the rotor 11 of a synchro generator 12 having stator windings 13, 14 and 15. Shaft 10 is considered to be in its zero position when the axis of rotor 11 is vertically disposed, that is, rotated slightly counterclockwise from the position shown in Fig. 1. The winding of rotor 11 is energized from a suitable source of alternating current 16, and stator windings 13, 14 and 15 are connected as shown to primary windings 17, 18 and 19 of a synchro receiver 20, to primary windings 21, 22 and 23 of a synchro receiver 24, and to primary windings 25, 26 and 27 of a synchro receiver 28.

Secondary windings 29, 30 and 31, respectively, of synchro receivers 20, 24 and 28, are fixedly positioned with different orientations. As shown in Fig. 1, for example, windings 29, 30 and 31 are positioned 120° apart. It will be understood that, without departing from the invention, the synchro receiving means alternatively could comprise a single synchro receiver having a single set of primary windings and a plurality of fixedly positioned secondary windings with different orientations.

As is well known, error voltages are developed in secondary windings 29, 30 and 31 as shaft 10 and rotor 11 are rotated. If rotor 11 is oriented exactly with a given one of the secondary windings, the error voltage across this winding is zero. This may be referred to as the index position. Rotation of rotor 11 in one direction, say clockwise, causes the development of an error voltage across the given secondary winding which is in phase with the voltage of source 16. Counterclockwise rotation of rotor 11, on the other hand, provides an error voltage which is in phase opposition to the voltage of source 16. Thus it will be apparent that clockwise rotation of rotor 11 through a position corresponding exactly with that occupied by the given secondary winding will produce an error voltage which suddenly changes from being in phase opposition to being in phase with respect to the voltage of source 16. If now rotor 11 is rotated through a position 180° from the index position, clockwise rotation produces an error voltage first in phase and then in phase opposition to the voltage of source 16. In accordance with the present invention, advantage is taken of selected ones of these sudden phase reversals to provide a digital indication of the rotational displacement of a rotatable member such as shaft 10.

For the purpose of utilizing the error voltages, discriminator units 32, 33 and 34 are associated respectively with secondary windings 29, 30 and 31. Discriminator units 32, 33 and 34 are also connected to alternating-current source 16, as shown. Each discriminator unit is capable of providing one of two possible output pulses, depending upon the direction of phase reversal of the error voltage in the associated secondary winding.

The register or counter comprises a first order designated generally by reference numeral 35 and a second order 36. It will be understood that additional orders may be provided if desired for the purpose of increasing the capacity of the system to count additional complete revolutions of shaft 10. The arrangement shown in Fig. 1 is adapted to count ten revolutions in steps or increments of one-third revolution. Means are provided for initially setting the register to zero when shaft 10 is in its zero position.

First order 35 comprises three stages 37, 38 and 39, each comprising a bi-stable trigger circuit capable of being either On or Off and having manifesting or indicating means to show when it is in the On condition. Stages 37, 38 and 39 are respectively associated with and directly actuated by discriminator units 32, 33 and 34. Each stage includes an arrangement which limits control of it by its associated discriminator circuit to once in each revolution of shaft 10. Furthermore, stages 37, 38 and 39 are so interconnected that the status of any stage has an effect upon the status of the preceding and succeeding stages. For example, if shaft 10 rotates one-third revolution in the clockwise or forward direction, a stage which is On is effective to cause turning On of the following stage which in turn causes the controlling stage to be turned Off. Upon the occurrence of a one-third revolution counterclockwise rotation of shaft 10, the On stage switches itself Off and turns the preceding stage On.

Second order 36 of the register comprises a plurality of bi-stable trigger circuits, each with an On indicator. An input pulse simultaneously applied to all stages turns Off the stage which is On. During operation in the forward direction, as each stage goes Off the following stage is turned On. Under reverse operation, the turning Off of a stage turns the preceding stage On. Initially, only the zero stage is On.

Stages 37 and 39 are connected to a carry unit 40, which in turn supplies second order 36 of the register. Stages 37, 38 and 39 are connected to a forward-reverse unit 41, outputs of which are supplied to second order 36 and to carry unit 40.

In operation, let it first be assumed that rotor 11 is rotating clockwise and has just passed through its zero position, as shown. The error voltage across secondary winding 29 has just changed from being in phase opposition to being in phase with the voltage of source 16, and discriminator unit 32 has provided a pulse output which causes stage 37 of first order 35 to be On. The On condition of this stage indicates that shaft 10 is still in the first increment of rotation from its zero position. The other stages are Off.

As shaft 10 continues to rotate clockwise the error voltage across secondary winding 30 changes from phase opposition to in phase with the voltage of source 16, and discriminator unit 33 causes second stage 38 to turn On, thus causing stage 37 to turn Off. The resultant indication shows that shaft 10 has turned through at least the first one-third revolution from its zero position, but has not yet reached the two-thirds position. Stage 37 is automatically rendered non-responsive to the output pulse from discriminator 32 as rotor 11 passes through the one-half revolution position, which would otherwise cause the register to regress by turning stage 37 On and stage 38 Off.

As rotation continues in a clockwise direction, stage 39 is turned On and stage 38 turned Off, thus indicating that shaft 10 is in the last third of the first revolution from its zero position. As clockwise rotation continues, stage 39 turns Off and a carry pulse is passed through carry unit 40 to second order 36. Due to the operation of forward-reverse unit 41, this carry pulse causes the first stage of second order 36 to be turned on and its zero stage to be turned Off. When stage 39 is turned Off, stage 37 is turned On, so that the register indicates that one complete revolution has been completed, but that less than one-third of the second revolution has been passed through.

Operation for shaft rotations in the opposite direction is similar, except that carry pulses are produced by stage 37 instead of stage 39 of first order 35, and forward-reverse unit 41 causes second order 36 to operate in the reverse direction when carry pulses are received.

The arrangement of Fig. 1 may employ an odd or even number of synchro receivers greater than the three shown by way of example, if desired, thus providing rotational indications with more than three increments or units in each revolution. In each case, the receiver secondary windings are positioned apart by an angle equal to 360° divided by the number of increments employed, and the first order of the register has a number of stages equal to the number of increments.

Figure 2:
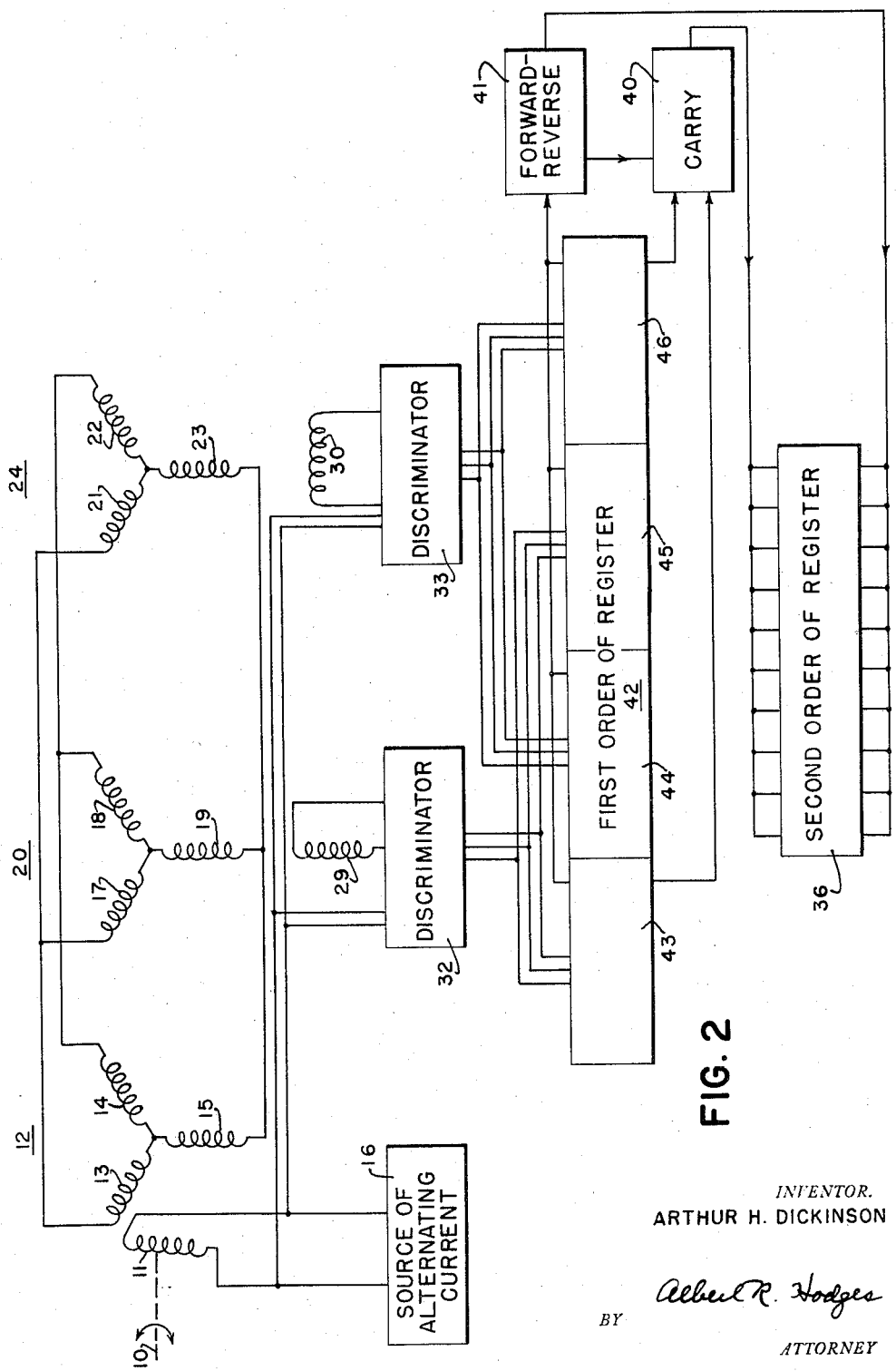
Fig. 2 is a schematic diagram, also partly in block form, of a modified embodiment of the present invention.

Fig. 2 shows a modification of the present invention which is adapted for use in applications where the number of increments in each revolution is even. Although similar in many respects to the arrangement of Fig. 1, the modified form exemplified by Fig. 2 has the important advantage that the number of synchro receivers and discriminator units required is only half the number of increments in each revolution.

Fig. 2 shows an arrangement in which there are four increments in each revolution, so that the rotational displacement of shaft 10 is indicated in units of quarter revolutions. Two synchro receivers 20 and 24 are provided, their secondary windings 29 and 30 being positioned 90° apart. Discriminator units 32 and 33 are associated respectively with secondary windings 29 and 30, and are also supplied with the voltage of alternating-current source 16, as shown.

The first order of the register, designated generally by the reference numeral 42, comprises four stages 43, 44, 45 and 46. As in the embodiment of Fig. 1, each stage includes an arrangement which limits control of it by its associated discriminator unit to once in each revolution of shaft 10. First stage 43 and third stage 45 are associated with discriminator unit 32. Second stage 44 and fourth stage 46 are associated with discriminator unit 33. Second order 36 of the register, carry unit 40 and forward-reverse unit 41 function in a manner similar to that described in connection with Fig. 1, carry unit 40 being supplied from first stage 43 and fourth stage 46 of first order 42 of the register.

In operation, let it first be assumed that rotor 11 is rotating clockwise and has just passed through its zero position, as shown. The error voltage across secondary winding 29 has just changed from being in phase opposition to being in phase with the voltage of source 16, and discriminator unit 32 has provided a pulse output which causes first stage 43 of first order 42 to be On. Although this pulse output is also supplied to third stage 45, this stage is automatically rendered non-responsive to this particular output pulse. Accordingly, only first stage 43 of first order 42 is turned On, all the other stages remaining Off, thus indicating that shaft 10 is still in the first increment of rotation from its zero position.

As shaft 10 continued to rotate clockwise, the error voltage across secondary winding 30 changes from phase opposition to in phase with the voltage of source 16, and discriminator unit 33 furnishes an output pulse which causes second stage 44 to turn On, thus causing first stage 43 to turn Off. The output of discriminator unit 33 is also supplied to fourth stage 46, but this particular output pulse has no effect upon the operation of this stage. The resultant indication shows that shaft 10 has turned through at least the first quarter revolution from its zero position, but has not yet reached the one-half revolution position.

As rotation continues in a clockwise direction, third stage 45 is turned On by a second output pulse from discriminator 32, to which first stage 43 is automatically rendered non-responsive. The resultant indication shows that shaft 10 is in its third quarter of the first revolution from its zero position. As clockwise rotation continues, fourth stage 46 is turned On by the second pulse from discriminator unit 33, this pulse having no effect upon second stage 44. The resultant indication shows that shaft 10 has passed the three-quarter point in its first revolution but has not yet completed a whole revolution. Further clockwise rotation causes the production of a carry pulse, the turning On of first stage 43, and the turning Off of fourth stage 46. Due to the operation of forward-reverse unit 41, this carry pulse causes the first stage of the second order 36 to be turned On and its zero stage to be turned Off. The resultant indication shows that shaft 10 has completed one whole revolution, but has not yet passed through the first quarter of a second revolution.

Operation for shaft rotations in the opposite direction is similar, except that carry pulses are produced by stage 43 instead of stage 46 of first order 42 and forward-reverse unit 41 causes second order 36 to operate in the reverse direction when carry pulses are received.

The arrangement of Fig. 2 may employ an even number of synchro receivers greater than the two shown by way of example, if desired, thus providing rotational indications with more increments or units in each revolution. In each case the receiver secondary windings are positioned apart by an angle equal to 360° divided by the number of increments employed, and the first order of the register has a number of stages equal to the number of increments. The number of synchro receivers and discriminator units required, however, need be only half the number of increments provided.

Figs. 4–13, arranged as shown in Fig. 3, comprise a schematic circuit diagram of a rotational displacement indicator of the general type exemplified by Fig. 1, except that each shaft revolution is divided into ten increments or units instead of three. In Figs. 4–13, shaft 10 drives rotor 11 of synchro generator 12 having stator windings 13, 14 and 15. The winding of rotor 11 is energized from alternating-current source 16. Stator windings 13, 14 and 15 are connected as shown to the primary windings of synchro receivers 50—59 having respectively secondary windings 60—69 fixedly positioned apart 36°, as shown.

Figure 4:
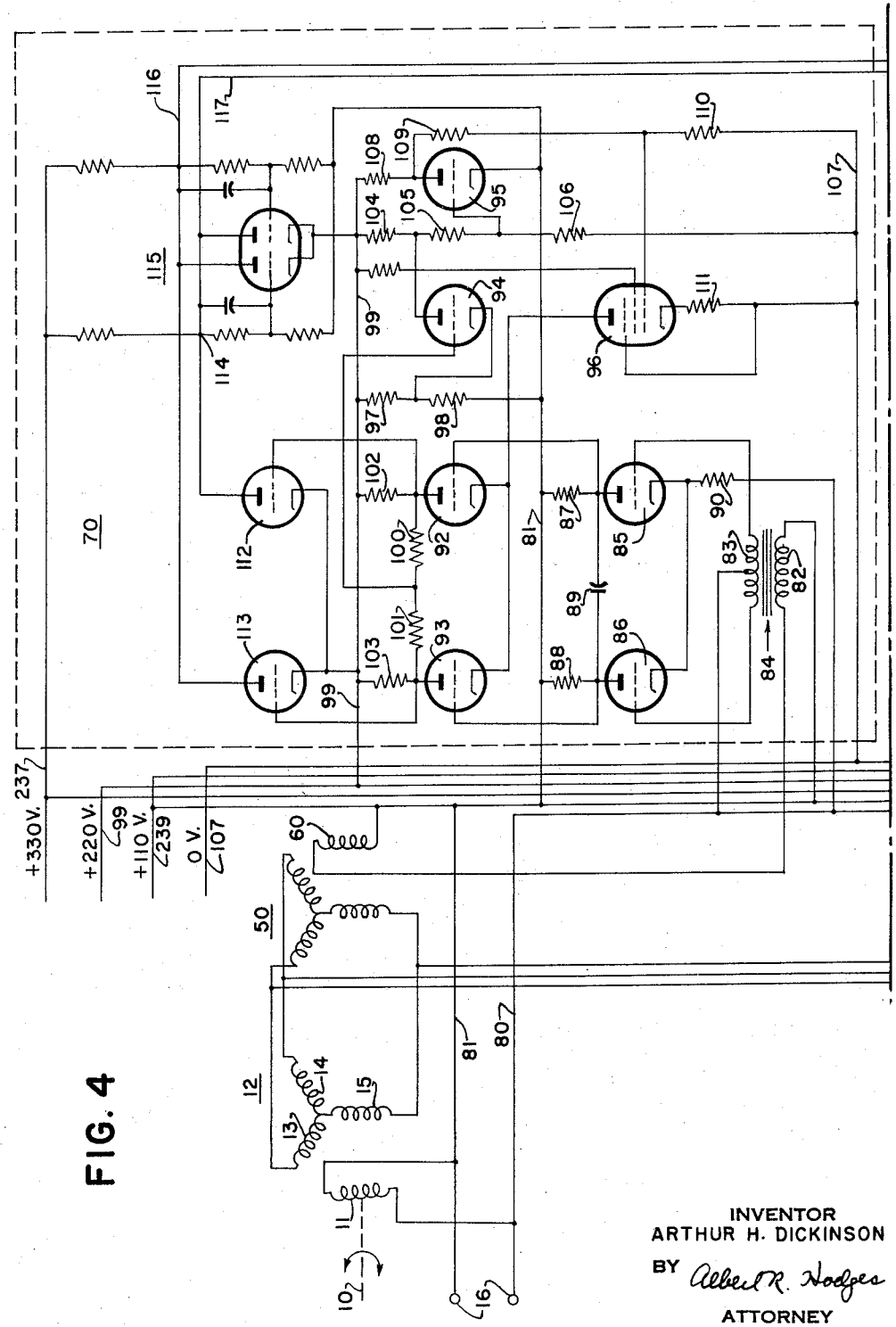

Error voltages developed in secondary windings 60—69 are respectively supplied to discriminator units 70—79, which are also connected to alternating-current source 16 by lines 80 and 81, as shown. Since all the discriminator units are identical, only unit 70 is shown in detail (Fig. 4). Its operation will now be described.

*The discriminator unit*

Error voltages developed across secondary winding 60 also appear across the primary winding 82 and the secondary winding 83 of a transformer 84. The center-tap of secondary winding 83 is connected to line 80 and the end terminals of winding 83 are connected to the control electrodes of tubes 85 and 86. The anodes of tubes 85 and 86 return to line 81 (also connected to the +110-volt terminal of the system power supply), respectively through resistors 87 and 88. A capacitor 89 is connected between the anodes of these tubes. The cathodes of tubes 85 and 86 are connected together and return to line 80 through a resistor 90. Since the anode-cathode potential of tubes 85 and 86 is provided from lines 80 and 81, these tubes conduct during only one half cycle in each full cycle of the potential of source 16, that is, tubes 85 and 86 conduct when line 81 is positive with respect to line 80.

The error voltage developed across secondary winding 60 is either in phase with or in phase opposition to the voltage of source 16. Due to the center-tapped arrangement of secondary winding 83 and the fact that its ends are connected to the control electrodes of tubes 85 and 86, one phase relationship causes tube 85 to conduct more than tube 86, and the other phase relationship causes a reversal of the relative conductions of these two tubes. Let it first be assumed that rotor 11 is in a position slightly counter-clockwise from its zero position, as shown, and that it is rotating in a forward or clockwise direction. Let it also be assumed that under this condition the voltage developed across secondary winding 60 is in phase opposition to the voltage of source 16. Under these conditions, tube 86 conducts more than tube 85 during the alternate half cycles when both tubes are conductive. This results in a greater voltage drop across resistor 88 than across resistor 87, so that capacitor 89 is charged with its right-hand terminal positive with respect to its left-hand terminal.

During the half cycle when both of tubes 85 and 86 are non-conductive, capacitor 89 discharges in the local circuit comprising resistor 88, line 81 and resistor 87. The anodes of tubes 85 and 86 are connected respectively to the control electrodes of tubes 92 and 93. The cathodes of tubes 92 and 93 are returned, through a tube 96 and a resistor 111, to line 107, which is connected to the zero-voltage terminal of the system power supply. Because the anodes of tubes 85 and 86 return to line 81, which is connected to the +110-volt terminal of the same power supply, the voltages developed across resistors 87 and 88 serve respectively as control voltages for tubes 92 and 93. Since the anode of tube 85 is thus rendered positive with respect to line 81 and the anode of tube 86 negative with respect to line 81, tube 92 conducts relatively more than tube 93. This condition exists as long as rotor 11 is advancing toward its zero position.

For the purpose of maintaining the total current passing through tubes 92 and 93 substantially constant, there is provided a stabilizing circuit comprising tubes 94, 95 and 96. The cathode of tube 94 is maintained at a predetermined value by a voltage divider comprising resistors 97 and 98 connected between lines 99 (+220 volts) and 81 (+110 volts). The grid of tube 94 is connected to the junction of resistors 100 and 101, connected in series between the anodes of tubes 92 and 93. The anodes of these tubes are returned to line 99 (+220 volts) respectively through resistors 102 and 103.

Any change in the mean anode potential of tubes 92 and 93 is applied to the control electrode of tube 94. The anode of tube 94 is returned to line 99 through a resistor 104 which, together with resistors 105 and 106, forms a voltage divider between lines 99 and 107. The junction of resistors 105 and 106 connects to the control electrode of tube 95. A change in the mean conduction of tubes 92 and 93 appears as an opposite change in the conduction status of tube 94. This changed conduction is amplified by means of tube 95 in a sense opposite to the action of tube 94, and is applied by tube 95 to a voltage divider comprising resistors 108, 109 and 110. The junction of resistors 109 and 110 connects to the control electrode of tube 96. The cathodes of tubes 92 and 93 are connected together and return to line 107 through tube 96 and resistor 111. By means of this arrangement, any change in the mean cathode-anode voltage of tubes 92 and 93 is reflected by a counteracting change in the conduction status of tube 96, thus maintaining substantially constant the total current passing through tubes 92 and 93.

As discussed above, upon discharge of capacitor 89, tube 92 is more conductive than tube 93. Accordingly, the voltage drop across resistor 102 is greater than that across resistor 103. Thus tube 112 is relatively nonconductive while tube 113 is relatively conductive.

Let it now be assumed that rotor 11 is turned in a clockwise direction to just past its zero position. This causes a reversal in the phase of the voltage across secondary winding 60, so that this voltage is now in phase with the voltage of source 16. Under this condition, tube 85 conducts more than tube 86, and capacitor 89 becomes charged with its left-hand terminal positive with respect to its right-hand terminal. Upon discharge of capacitor 89, the anode of tube 86 is rendered positive with respect to line 81, and tube 93 conducts more than tube 92. Accordingly, the voltage drop across resistor 103 increases while that across resistor 102 decreases. Consequently, tube 112 is highly conductive while tube 113 is relatively non-conductive.

The anode of tube 112 connects to junction 114 of a conventional bi-stable trigger circuit 115. The instant the phase relationship of the error voltage in secondary winding 60 reverses, as just described, tube 112 conducts and switches trigger circuit 115 from Off to On. This switching of trigger circuit 115 from Off to On causes the production of a positive voltage pulse in line 116, and is indicative of the fact that rotor 11 has reached its zero position while moving in a forward direction. Movement of rotor 11 through its zero position in a counterclockwise direction would cause the discriminator unit to operate in a similar fashion to produce a positive voltage pulse in line 117.

*First order of register*

The first order of the register (Figs. 5-10) comprises a plurality of bi-stable trigger circuits 120—129, with which are associated respectively self-restoring trigger circuits 130—139. Let it first be assumed that rotor 11 (Fig. 4) is moving in a forward or clockwise direction and has just passed through its zero position. Under this condition, trigger circuit 120 (Figure 5) is On and the potential of its junction 140 is at the higher of two values. The cathode of a cathode follower 141 (Fig. 6) is connected through a resistor 142 to line 239 (+110 volts) and its anode is connected to line 237 (+330 volts). Thus its cathode is always somewhat more positive than line 239. The right-hand control electrode of a dual vacuum tube 143 is connected to this cathode. The right-hand cathode of tube 143 is returned through a transistor 149 (Fig. 10) to line 99 (+220 volts). Hence the right-hand portion of tube 143 is normally negatively biased, its exact bias depending upon the potential of the control electrode of tube 141. This electrode is connected to junction 140 so that, when trigger circuit 120 is On as just stated, this tube is in a condition of higher conduction. The resultant increased potential drop across resistor 142 partially reduces the negative bias on the control electrode of the right-hand portion of dual vacuum tube 143. As rotor 11 continues to rotate, a positive pulse is developed in output line 144 of discriminator unit 71, this pulse being applied by means of capacitor 145 to the right-hand control electrode of dual vacuum tube 143.

Figure 10:
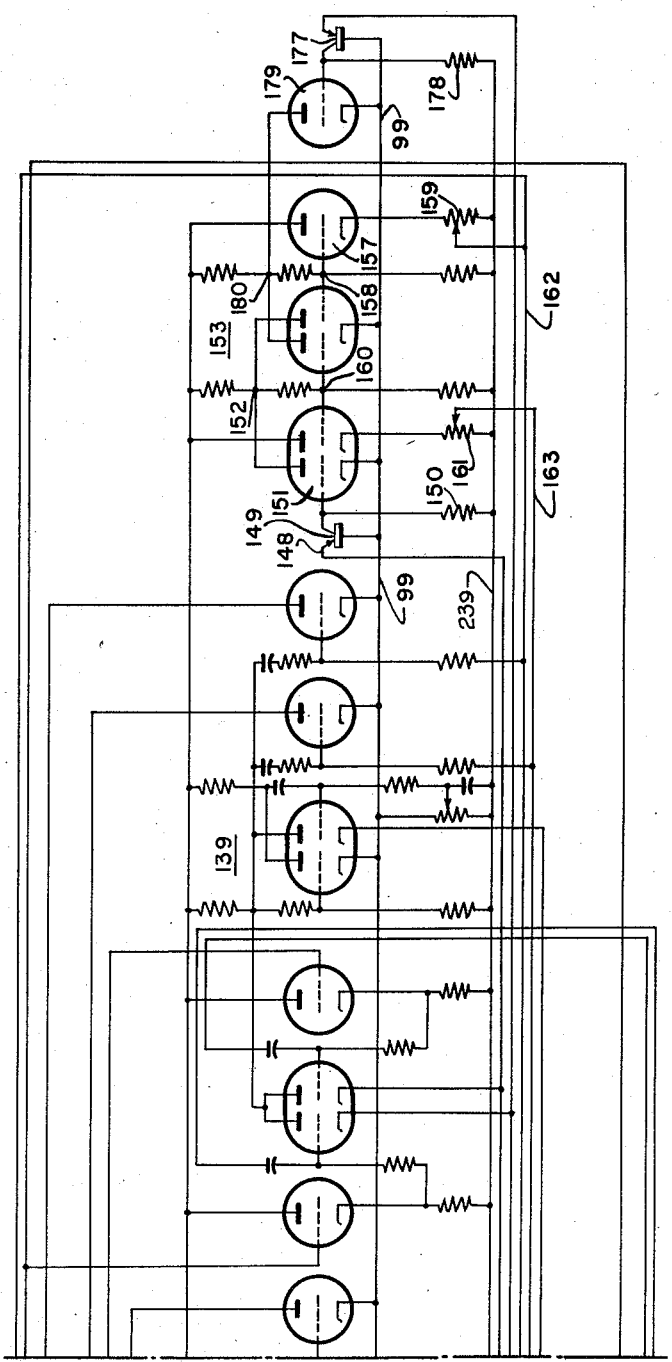

The positive pulse thus applied to this control electrode, together with the previously described negative bias reduction due to trigger circuit 120 being On, causes increased current flow through the right-hand portion of vacuum tube 143. The right-hand anode of this tube connects to junction 146 of self-restoring trigger circuit 131 which includes dual vacuum tube 147. The pulse produced by the right-hand portion of tube 143 lowers the potential of junction 146 and thus renders the left-hand portion of tube 147 nonconductive. The resultant rise in the left-hand anode potential is applied, through a capacitor 156, to the right-hand control electrode of tube 147, thus rendering the right-hand portion of this tube conductive and hence causing trigger circuit 131 to switch from Off to On status. The right-hand cathode of vacuum tube 143 connects to emitter electrode 148 of a transistor 149, the base of which connects to line 99 (+220 volts), as shown in Fig. 10. The collector of transistor 149 returns to line 239 (+110 volts) through a resistor 150. The left-hand control electrode of a dual vacuum tube 151 is connected to the collector of transistor 149. The increased current flow through the right-hand portion of vacuum tube 143 increases the emitter potential and hence the current of transistor 149. The resultant positive pulse produced at resistor 150 causes the left-hand portion of vacuum tube 151 to conduct. The left-hand anode of this vacuum tube is connected to junction 152 of a bi-stable trigger circuit 153 comprising the forward-reverse unit (Fig. 10). The increased conduction of the left-hand portion of vacuum tube 151 has no effect upon trigger circuit 153 if it is already On, but switches it from Off to On status, should it have been Off.

From the above, it is apparent that when rotor 11 passes through the one-tenth revolution position, the resultant positive pulse developed by discriminator unit 71 in its output line 144 causes forward-reverse trigger circuit 153 to assume its On status and switches self-restoring trigger circuit 131 comprising vacuum tube 147 from Off to On status. When trigger circuit 131 switches itself Off, the first order of the register changes from "zero" to "1."

The length of time trigger circuit 131 remains in the On status is determined in part by the values of resistors 154 and 155 and of capacitor 156. The values of these components are preferably such that trigger circuit 131 returns to Off status very shortly after forward-reverse trigger circuit 153 switches On. The control electrode of a vacuum tube 157 is connected to junction 158 of trigger circuit 153 so that, with trigger circuit 153 On, vacuum tube 157 is highly conductive and there is an increased potential drop across resistor 159. With trigger circuit 153 On the potential of junction 160 is low, so that the right-hand portion of vacuum tube 151 is in low conduction status and the potential drop across resistor 161 is relatively low. The lines 162 and 163 are connected to the adjustable taps on resistors 159 and 161, respectively, as shown. Accordingly, the potential of line 162 is higher than that of line 163. The control electrode of a vacuum tube 164 returns through a resistor 165 to line 162. When line 162 is at the higher of two possible potentials, the control electrode bias of vacuum tube 164 is partially reduced.

When trigger circuit 131 switches Off, the potential of junction 146 rises. This junction is coupled by means of capacitor 166 to the control electrode of vacuum tube 164, so that the positive pulse supplied to this control electrode, together with its reduced bias causes vacuum tube 164 to conduct. The anode of vacuum tube 164 is connected to junction 167 of trigger circuit 121, so that the conduction of vacuum tube 164 causes trigger circuit 121 to switch On. Junction 168 is coupled by a capacitor 169 to the control electrode of a vacuum tube 170. The rise in potential of junction 168 applies a pulse to the control electrode of vacuum tube 170, causing its conduction. The anode of vacuum tube 170 is connected to junction 171 of trigger circuit 120. Accordingly, the switching on of trigger circuit 121 effects conduction of associated vacuum tube 170, which in turn causes trigger circuit 120 to switch Off.

There has just been described the manner in which, upon rotation of shaft 10 and rotor 11 in a forward or clockwise direction through an incremental position (for example, the one-tenth revolution position), such position and direction of rotation are detected and provide the basis for an entry into a digital register, which is caused to increase its manifestation by one incremental amount. Let it now be assumed that, after reaching the one-tenth revolution position but prior to attaining the two-tenths position, shaft 10 and rotor 11 reverse in direction and pass through the one-tenth position in a counterclockwise or backward direction toward the zero position. Under these conditions, a phase reversal of the voltage in secondary winding 61 occurs, so that a positive pulse is developed in output line 172 of discriminator unit 71.

Junction 173 of trigger circuit 121 connects to the control electrode of a vacuum tube 174. With trigger circuit 121 On vacuum tube 174 is highly conductive and the resultant increased voltage drop across resistor 175 partially reduces the control electrode bias on the left-hand portion of dual vacuum tube 143. Output line 172 of discriminator unit 71 is coupled by a capacitor 176 to the left-hand control electrode of vacuum tube 143, so that the positive pulse developed in this line together with the already reduced negative bias on the left-hand control electrode causes the left-hand portion of vacuum tube 143 to conduct. The two anodes of vacuum tube 143 are connected together so that conduction of the left-hand portion of this tube causes trigger circuit 131 to switch On. The left-hand cathode of vacuum tube 143 returns to line 99 through the emitter of a transistor 177. Such a circuit arrangement is disclosed and claimed in copending application Serial No. 177,447, Arthur H. Dickinson, filed August 3, 1950, and assigned to the same assignee as the present application. The collector of transistor 177 returns to line 107 through a resistor 178.

The control electrode of vacuum tube 179 is connected to the collector of transistor 177. The conduction of the left-hand portion of vacuum tube 143 causes an increase in the emitter potential and hence in the current of transistor 177, the resultant increased current flow through resistor 178 causing vacuum tube 179 to conduct. The anode of vacuum tube 179 connects to junction 180 of forward-reverse trigger circuit 153, so that conduction of this tube causes trigger circuit 153 to switch from On to Off. This condition causes decreased conduction of vacuum tube 157 and increased conduction of the right-hand portion of dual vacuum tube 151. The shifts in the relative voltage drops across resistors 159 and 161 result in the potential of line 163 being higher than that of line 162.

Shortly after forward-reverse trigger circuit 153 switches to Off status, self-restoring trigger circuit 131 likewise turns Off. Junction 146 of trigger circuit 131 is coupled by a capacitor 181 to the control electrode of a vacuum tube 182. This control electrode returns to line 163 through a resistor 183. The positive pulse applied to the control electrode of vacuum tube 182 through capacitor 181, together with the raised potential of line 163, renders vacuum tube 182 conductive. The anode of vacuum tube 182 connects to junction 168 of trigger circuit 121, so that the conduction of vacuum tube 182 results in the switching Off of trigger circuit 121.

A capacitor 184 couples junction 167 of trigger circuit 121 to the control electrode of a vacuum tube 185. This control electrode is returned to line 163 through a resistor 186. When trigger circuit 121 switches Off, capacitor 184 applies a positive pulse to the control electrode of vacuum tube 185. This pulse, together with the already reduced negative bias brought about by the raised potential of line 163, causes vacuum tube 185 to conduct. The anode of vacuum tube 185 is connected to junction 187 of trigger circuit 120, so that conduction of vacuum tube 185 causes trigger circuit 120 to switch On upon the switching Off of trigger circuit 121.

There has just been described the manner in which, upon rotation of shaft 10 and rotor 11 in a reverse or counterclockwise direction, the passage through an incremental position (for example, the one-tenth revolution position) in this direction is detected and an entry made in the digital register to thereby decrease its manifestation by one incremental amount.

From the preceding description it will be apparent that each of trigger circuits 120—129 comprising the first order of the register is directly and positively controlled by a corresponding one of discriminator units 70—79. Accordingly, the register remains in exact registration with shaft 10 to the nearest incremental position, that is, within one-tenth of a revolution in the arrangement here shown by way of example. The first action taken as the shaft traverses an incremental position is establishment of its direction of rotation by appropriate actuation of forward-reverse trigger circuit 153. After determination of the direction of shaft rotation, the second action of the system is to add or subtract an incremental amount in the register. The status of any one of trigger circuits 120—129 effects control of the trigger circuit following it in the series and of the trigger circuit preceding it in the series. If an incremental position is traversed in the forward direction, the On trigger circuit is effective to cause turning On of the trigger circuit following it in the series. This turning On of the following trigger circuit causes switching Off of the controlling trigger circuit. If the traversal of an incremental position occurs as the shaft rotates in a reverse direction, the On trigger circuit switches itself Off, this action bringing about the turning On of the preceding trigger circuit in the series.

When shaft 10 and rotor 11 advance from five-tenths of a revolution to the six-tenths position, a special situation arises due to the fact that the phase of the error voltage in secondary winding 61 again reverses since this secondary winding has now turned through 180°. In other words, a phase change occurs not only in secondary winding 66, but also in secondary winding 61. The former change is useful and causes the first order of the register to change from "5" to "6" in a manner similar to that described above in connection with the change from "0" to "1."

If the phase change which occurs in secondary winding 61 were permitted to be effective, on the other hand, it would attempt to cause the first order of the register to erroneously regress from "1" to "0." In accordance with an important feature of the present invention, an arrangement is provided which prevents such an erroneous response by the first order of the register.

Under the conditions just outlined, trigger circuit 125 is the only one in the first order of the register which is in On status. In this status, trigger circuit 125 causes associated vacuum tube 188 to be relatively more conductive, thereby partially reducing the control electrode bias of the right-hand portion of a dual vacuum tube 189. The phase change which occurs in secondary winding 66 causes a positive pulse to be developed in output line 190 of discriminator unit 76. This pulse is applied through a capacitor 191 to the right-hand control electrode of vacuum tube 189, thereby resulting in the turning On of trigger circuit 126 in the manner previously described.

Since trigger circuit 121 is Off, the potential of its junction 173 is low and associated vacuum tube 174 is relatively non-conductive. Even though the phase change occurring in secondary winding 61 causes a positive pulse to be developed in output line 172, this pulse when applied to the left-hand control electrode of vacuum tube 143 through capacitor 176 is ineffective in rendering the left-hand portion of this tube conductive. Accordingly, the phase change occurring in secondary winding 61 as shaft 10 and rotor 11 advance from the five-tenths to the six-tenths revolution position is ineffective to bring about an unwanted entry into trigger circuit 121.

If shaft 10 and rotor 11 were now to reverse direction and pass through the six-tenths toward the five-tenths position, the phase change in secondary winding 61 would be such that, if it were permitted to be effective, it would attempt to cause the register to advance from "0" to "1." Since trigger circuit 120 is Off at this time, the conduction of its associated vacuum tube 141 is relatively low, so that the positive pulse developed in output line 144 of discriminator unit 71 and applied to the right-hand control electrode of vacuum tube 143 through capacitor 145 is ineffective.

From the foregoing description it is apparent that the function of vacuum tubes 141 and 174 associated with trigger circuit 121 and of the equivalent tubes in each of the other stages or positions of the first order of the register is to limit the control by a discriminator unit of its related register stage to once during each revolution of shaft 10 through 360°.

The carry unit

Since the register must be capable of manifesting a plurality of complete revolutions of shaft 10, as the first order passes from "9" to "0" when shaft 10 rotates in a forward direction a carry must be applied to the next higher order of the register. On the other hand, if shaft 10 rotates in a reverse direction so that the first order of the register passes from "0" to "9," a carry must likewise be applied to the next higher order of the register. This is accomplished by the carry unit (Fig. 8), the operation of which will now be described.

The control electrode of a vacuum tube 193 returns to line 162 through a resistor 194. As previously explained, as shaft 10 is rotating in a forward direction, the potential of line 162 is at the higher of two values. The control electrode of vacuum tube 193 is coupled by a capacitor 195 to junction 196 of trigger circuit 129 of the first order of the register. As trigger circuit 129 switches Off when the first order passes from "9" to "0," the rise in potential of junction 196 applies a positive pulse to the control electrode of vacuum tube 193. This pulse, together with the raised potential of line 162, causes current flow through vacuum tube 193 and its load resistor 197. The resultant negative pulse developed at the anode of vacuum tube 193 is applied by means of a line 198 to the next higher order of the register, with a result subsequently to be described.

Figure 5:
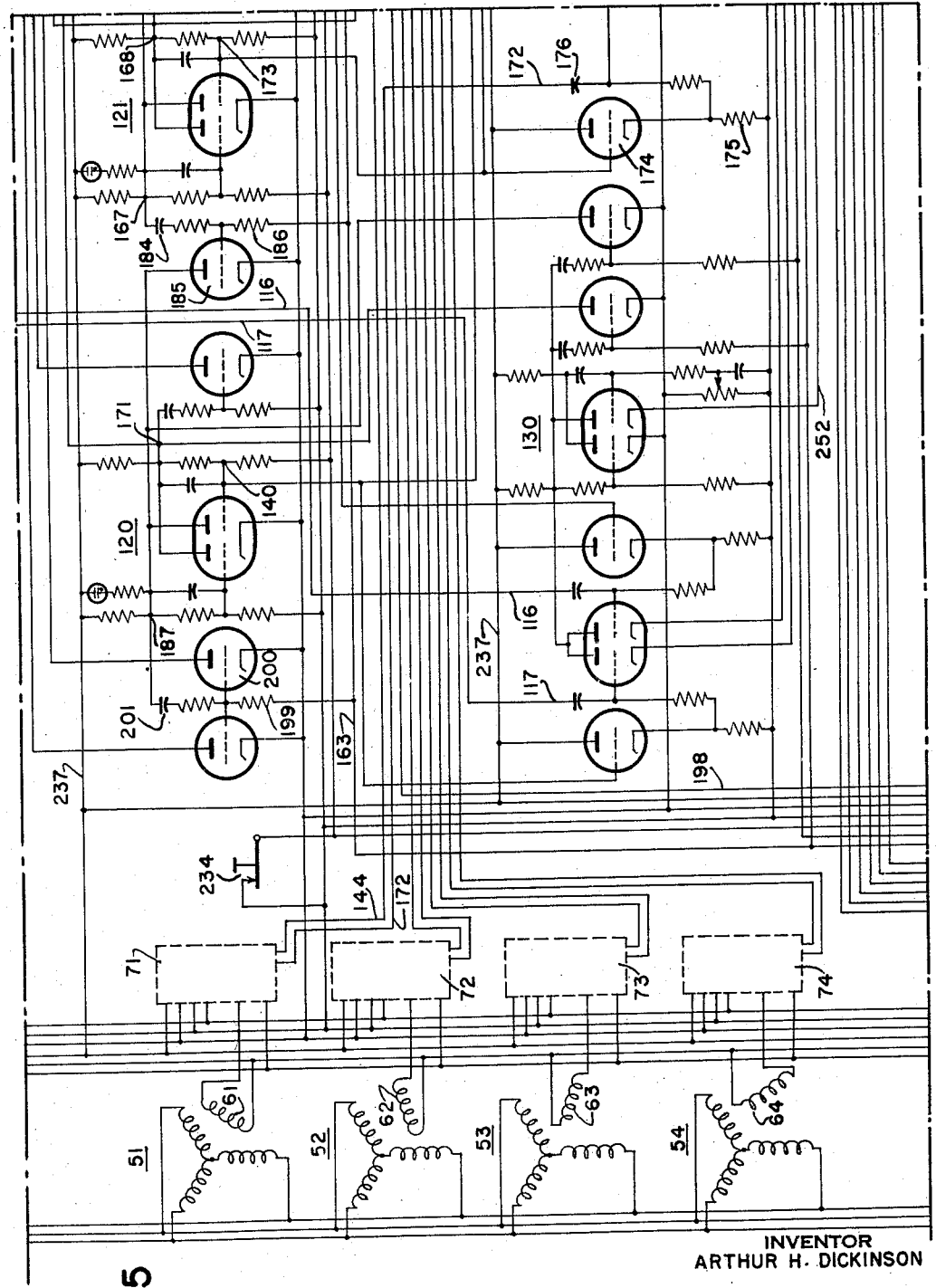
Figure 6:
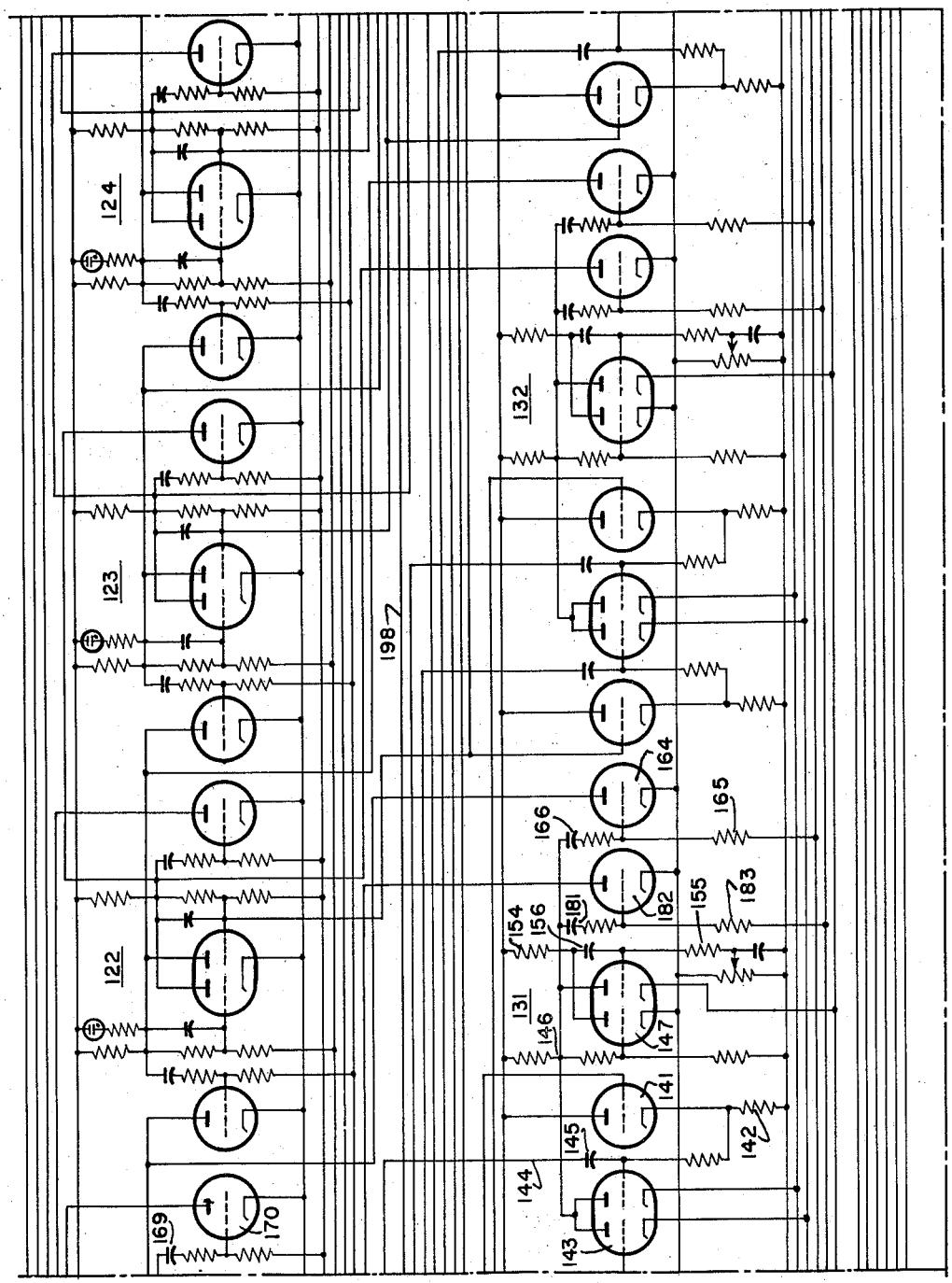
Figure 7:
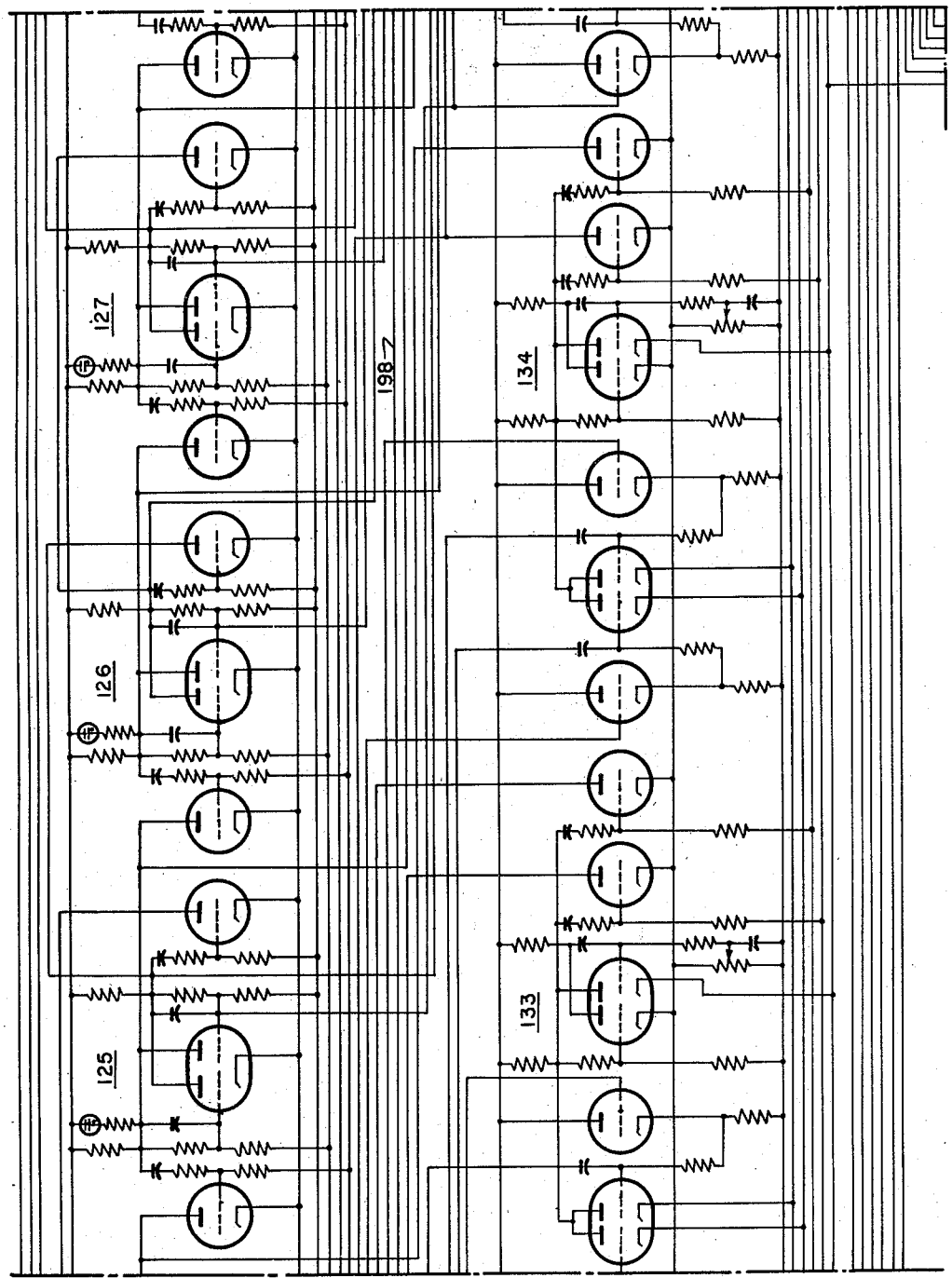

Resistor 199 provides a return circuit to line 163 for the control electrode of a vacuum tube 200 associated with trigger circuit 120 (Fig. 5). When shaft 10 rotates in a reverse direction, the potential of line 163 is raised. When the first order of the register passes from "0" to "9," the switching Off of trigger circuit 120 causes the potential of its junction 187 to rise. The resultant positive pulse is applied through a capacitor 201 to the control electrode of vacuum tube 200 and, since its bias is partially reduced by the raised potential of line 163, this tube conducts. The anode of vacuum tube 200 is connected to the anode of vacuum tube 193, so that the negative pulse developed across resistor 197 due to the conduction of vacuum tube 200 is applied by line 198 to the next higher order of the register. The effect of this pulse in the next higher order during reverse operation of the register will be described subsequently.

Higher orders of register

Figure 11:
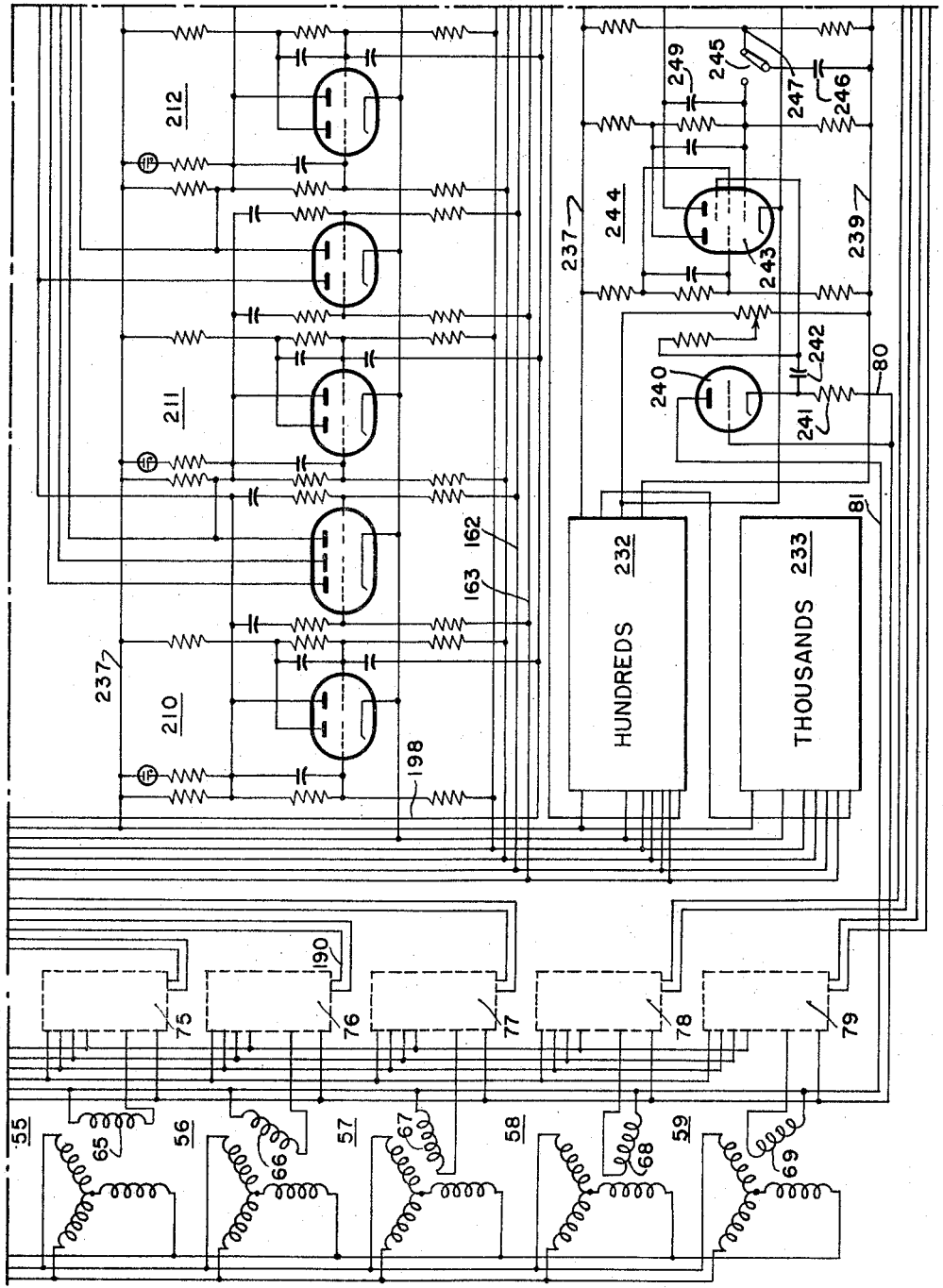
Figure 12:
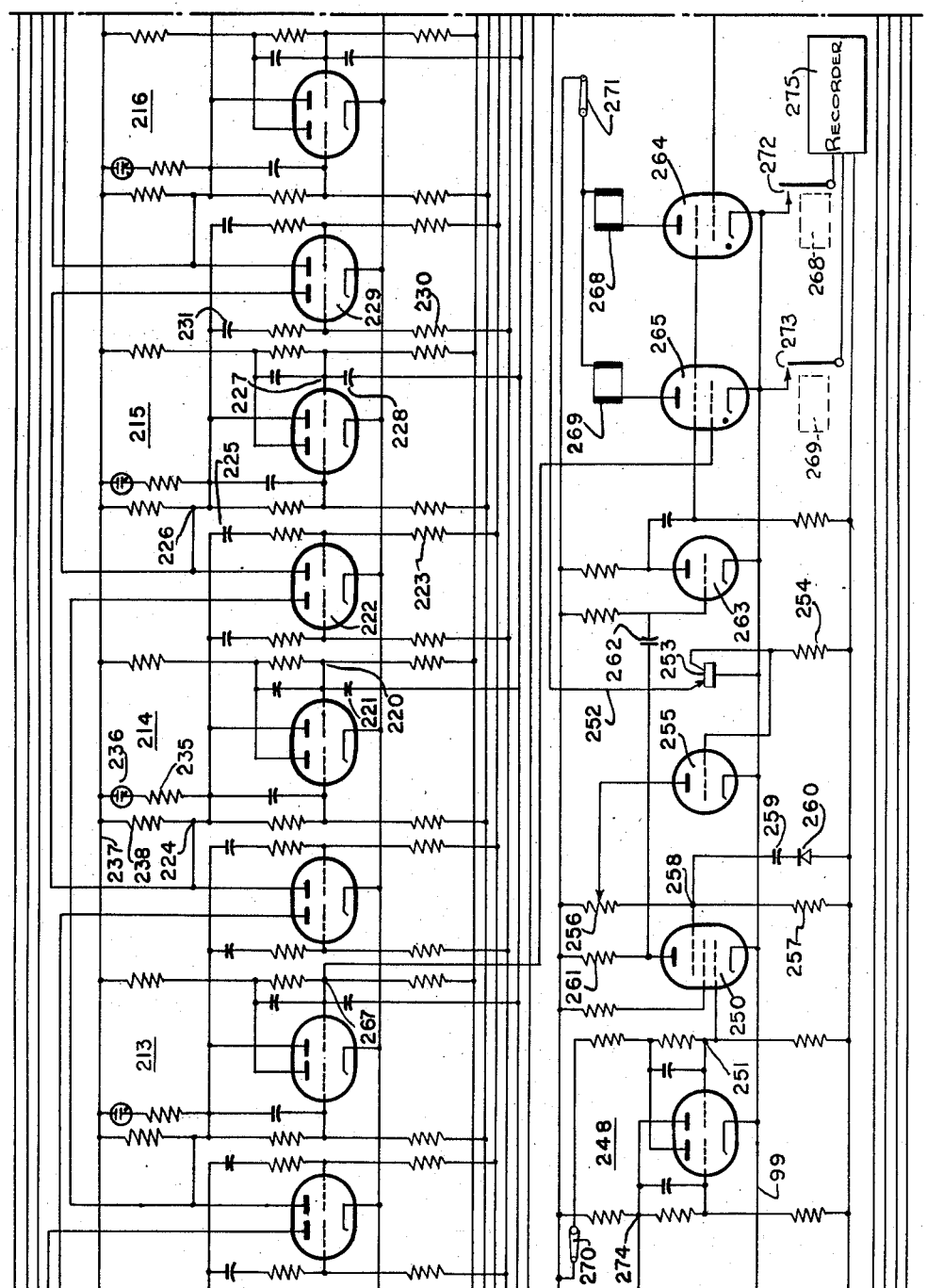

As shown in Figs. 11–13, the second order of the register comprises ten trigger circuits 210—219 of the bistable type, that is, having two conditions of stability. A carry into this order of the register is applied in the form of a negative pulse on line 198 simultaneously to each stage of the order. The effect of this pulse is to turn Off the particular trigger circuit which is On. This stage in going Off turns On the following stage during operation in the forward direction. If operation is in the reverse direction, the turning Off of a stage switches the preceding stage On.

Let it be assumed that trigger circuit 214 is On. Junction 220 of trigger circuit 214 is coupled to line 198 by a capactor 221. The negative pulse due to a carry on line 198 is effective through capacitor 221 to switch trigger circuit 214 Off. If, upon the occurrence of this pulse in line 198, shaft 10 is rotating in the forward direction, trigger circuit 153 (Fig. 10) is On and the potential of line 162 is at the higher of two values. The right-hand control electrode of a dual vacuum tube 222 returns to line 162 through a resistor 223. As trigger circuit 214 switches Off, the rise in potential of its junction 224 is applied as a positive pulse through a capacitor 225 to the right-hand control electrode of vacuum tube 222. This pulse, together with the raised potential of line 162, causes the right-hand portion of vacuum tube 222 to momentarily conduct. Since the right-hand anode of vacuum tube 222 is connected to junction 226 of trigger circuit 215, the latter trigger circuit is turned On.

Now let it be assumed that shaft 10 reverses and the first order of the register passes from "0" to "9." As previously described, this results in a carry in the form of a negative pulse on line 198. This negative pulse is applied to junction 227 of trigger circuit 215 through a capacitor 228, and causes trigger circuit 215 to turn Off. Since operation of shaft 10 is now in the reverse direction, the potential of line 163 is higher than that of line 162. The left-hand control electrode of a dual vacuum tube 229 returns to line 163 through a resistor 230, and a capacitor 231 couples this control electrode to junction 226 of trigger circuit 215. The rise in the potential of this junction as trigger circuit 215 switches Off causes the application of a positive pulse, through capacitor 231, to the left-hand control electrode of vacuum tube 229. This pulse, together with the raised potential of line 163, renders the left-hand portion of vacuum tube 229 conductive. The left-hand anode of vacuum tube 229 is connected to junction 224 of trigger circuit 214, so that the conduction of the left-hand portion of vacuum tube 229 causes trigger circuit 214 to switch On as trigger circuit 215 switches Off.

The construction and operation of the third and fourth orders of the register, indicated by blocks 232 and 233, is similar in every respect to those of the second order of the register, just described. Accordingly, no further description of these two higher orders is believed to be necessary.

For the purpose of initially resetting the register to "0000" when rotor 11 is in its zero position, a switch 234 (Fig. 5) is provided. The effect of momentarily opening this switch is to switch all the trigger circuits of the register except those representative of "0" to Off status, and to switch the "0" trigger circuits to "On" status.

The opening of switch 234, for example, permits junction 140 of trigger circuit 120 (Fig. 5) to rise in potential, so that the right-hand portion of the dual tube becomes conductive and this "0" trigger circuit is turned On. In the case of trigger circuit 121, however, the momentary removal of +110 volts (line 239) by the opening of switch 234 causes a rise in potential of the left-hand control electrode of the dual tube comprising this trigger circuit, rendering the left-hand portion conductive and thus turning the trigger circuit Off.

Each trigger circuit of the register is provided with means for visibly indicating or manifesting its On and Off status. Referring to trigger circuit 214 of the second order of the register, junction 226 is connected through a resistor 235 and a gaseous discharge device 236 such as a neon lamp to line 237. When trigger circuit 214 is Off, the potential drop across resistor 238 is insufficient to cause neon lamp 236 to fire. When trigger circuit 214 is On, however, the voltage drop across resistor 238 is high and is sufficient to cause neon lamp 236 to fire and thus visibly glow. Resistor 235 limits the current through neon lamp 236 to a value just sufficient to maintain it fired when trigger circuit 214 is On. With this arrangement, the status of any trigger circuit in the register may be visually determined, and the digital value contained in the register may be ascertained so long as the rate of entry into the register can be followed by eye.

Auxiliary storage device

In addition to visibly indicating or manifesting the amount standing in the register, in some instances it may be desirable to make a record of this amount, as for example on a record card. To accomplish this, an auxiliary storage device (Figs. 11 and 12) employing relays may be utilized, this device being interposed between the register and recording mechanism which, for example, may comprise a record-controlled card punching machine (not shown).

The alternating-current voltage from source 16 (Fig. 4), appearing between lines 80 and 81, causes a current flow through a vacuum tube 240 and its cathode resistor 241 during one half of each cycle. The pulse developed across resistor 241 is applied by means of a capacitor 242 to the suppressor grid of the right-hand portion of a vacuum tube 243. Both portions of this vacuum tube comprise a bi-stable trigger circuit 244. This trigger circuit is normally Off, so that the anode-cathode circuit of the right-hand portion of vacuum tube 243 is normally open. With single-pole, double-throw switch 245 in the position shown, capacitor 246 is charged to a potential determined by the potential of junction 247.

Switch 245 is reversed to transfer the amount standing in the register to the auxiliary storage device. The resultant discharge of capacitor 246 into trigger circuit 244 switches this circuit to its On status. Since the bias on the right-hand control electrode of vacuum tube 243 is now substantially zero, the next pulse developed across resistor 241 is effective to cause anode-cathode current flow in the right-hand portion of this vacuum tube. The right-hand anode of vacuum tube 243 connects to junction 274 of a bi-stable trigger circuit 248. As trigger circuit 248 switches On, the potential of junction 274 decreases and a negative pulse is applied through a capacitor 249, thus restoring trigger circuit 244 to its Off status. The control electrode of a pentode vacuum tube 250 is connected to junction 251 of trigger circuit 248. With trigger circuit 248 now On, the screen-cathode path of vacuum tube 250 is conductive.

In accordance with an important feature of the present invention, an arrangement is provided to insure that no transfer from the register to the auxiliary storage device occurs when shaft 10 and rotor 11 are traversing an incremental position. As described above, the fact that such a traversal is occurring is indicated if any of self-restoring trigger circuits 130—139 (Figs. 5–10) are in On status, that is, when for example the right-hand portion of vacuum tube 147 of trigger circuit 131 or the equivalent vacuum tube portion in any of the other self-restoring trigger circuits is conductive. The cathode return circuits of all these vacuum tube portions is through a line 252 to the emitter of a transistor 253. Thus when any one of self-restoring trigger circuits 130—139 is On, the emitter voltage and hence the current of transistor 253 is raised. This causes an increased current flow through the collector of transistor 253 and through its load resistor 254. The collector of transistor 253 is connected to the control electrode of a vacuum tube 255.

When the voltage drop across resistor 254 increases under the conditions just stated, vacuum tube 255 becomes conductive. This causes increased current flow through the upper portion of resistor 256, thus producing decreased voltage drops across the lower portion of resistor 256 and across resistor 257. Junction 258 of resistors 256 and 257 is connected to the suppressor grid of vacuum tube 250. Thus, even though trigger circuit 248 is On, an entry into the register prevents anode-cathode current flow through vacuum tube 250 because of the decreased potential of junction 258 and the resultant relatively high negative potential on its suppressor grid. Upon completion of the entry, however, the voltage drop across resistor 254 decreases, vacuum tube 255 becomes non-conductive, and the resultant rise in potential of junction 258 reduces the suppressor grid bias of vacuum tube 250 to substantially zero.

Although vacuum tube 255 cuts off substantially instantaneously when any one of self-restoring trigger circuits 130—139 turns Off, the anode-cathode current in vacuum tube 250 is somewhat delayed in arriving at its full value. This time delay is preferably just long enough to permit the register to effect carry operation from the first order through the higher orders of the register. The desired amount of delay is achieved by shunting resistor 257 with a series circuit comprising a capacitor 259 and a rectifier 260 which may comprise a germanium diode. Rectifier 260 is so connected that, as capacitor 259 charges, the rectifier presents its high back resistance to the direction of current flow. Accordingly, the capacitance of capacitor 259 and the back resistance of rectifier 260 together determine the rise time of the voltage, applied to the suppressor grid of vacuum tube 250, up to the value at which vacuum tube 250 becomes conductive.

Whenever anode-cathode current flows through vacuum tube 250, the negative pulse developed across load resistor 261 is applied through a capacitor 262 to the control electrode of a vacuum tube 263 which is normally operated at zero bias. This negative pulse renders vacuum tube 263 non-conductive, causing the development of a positive pulse at the anode of this tube. This positive pulse is applied to the suppressor grids of a plurality of gaseous discharge tubes. One of these tubes is associated with each of the bi-stable trigger circuits of the register, so that a total of forty such tubes would be required with the register herein illustrated and described. For the purpose of simplicity, however, only discharge tubes 264 and 265 are shown, associated respectively with trigger circuit 129 in the first order of the register and trigger circuit 213 in the second order of the register. Junction 266 of trigger circuit 129 (Fig. 8) is connected to the control electrode of discharge tube 264, and junction 267 of trigger circuit 213 is connected to the control electrode of discharge tube 265.

Thus, if at the time trigger circuit 248 is switched On, the amount standing in the first and second orders of the register is "39," trigger circuits 129 and 213 are On and hence the control electrode bias of discharge tubes 264 and 265 are substantially zero. The positive pulse appearing at the anode of vacuum tube 263 and applied to the suppressor grids of discharge tubes 264 and 265 causes these tubes to fire. This results in the energization of relays 268 and 269 (the windings only of which are shown), associated respectively with discharge tubes 264 and 265, and arranged to actuate the associated recording mechanism 275 which may, for example, comprise a card punching machine such as that of Lake Patent Re. 21,133 dated June 27, 1939. The discharge tubes associated with the remaining trigger circuits, which are Off, have their control electrodes negatively biased, so these discharge tubes do not fire when the positive pulse is applied to their suppressor grids.

Following a recording operation controlled by the contacts 272 and 273 of relays 268 and 269, switches 270 and 271, normally closed, are opened to turn trigger circuit 248 Off and to effect de-energization of relays 268 and 269 and of any discharge tubes, such as tubes 264 and 265, which are fired. This momentary opening of switches 270 and 271, which may be accomplished manually but is preferably automatic, prepares the auxiliary storage device for the next transfer from the register to the relays.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention.

It is the intention, therefore, to be limited only as indicated by the scope of the following claims.

What is claimed is:

1. Apparatus for indicating the rotational displacement of a rotatable member, comprising: a synchro generator having its rotor driven by said rotatable member and its rotor winding energized by a suitable source of alternating current, synchro receiving means having primary windings connected to the stator windings of said synchro generator and having a plurality of secondary windings fixedly positioned with relatively different orientations of their electrical axes, and discriminator means responsive respectively to error voltages developed in said secondary windings whenever the electrical axis of said rotor winding passes through predetermined positions to provide output pulses indicative of the presence and phase of said error voltages.

2. Apparatus for indicating the rotational displacement of a rotatable member, comprising: a synchro generator having its rotor driven by said rotatable member and its rotor winding energized by a suitable source of alternating current, synchro receiving means having primary windings connected to the stator windings of said synchro generator and having a number of secondary windings fixedly positioned with their electrical axes spaced apart by an angle equal to 360° divided by said number, and discriminator means responsive respectively to error voltages developed in said secondary windings whenever the electrical axis of said rotor winding passes through predetermined positions to provide output pulses indicative of the presence and phase of said error voltages.

3. Apparatus for indicating the rotational displacement of a rotatable member in increments equal to 360° divided by a given number, comprising: a synchro generator having its rotor driven by said rotatable member and its rotor winding energized by a suitable source of alternating current, synchro receiving means having primary windings connected to the stator windings of said synchro generator and having a group of secondary windings equal in number to said given number, said secondary windings being fixedly positioned with relatively different orientations of their electrical axes, and discriminator means responsive respectively to error voltages developed in said secondary windings whenever the electrical axis of said rotor winding passes through predetermined positions to provide output pulses indicative of the presence and phase of said error voltages.

4. Apparatus for indicating the rotational displacement of a rotatable member in increments equal to 360° divided by a given even number, comprising: a synchro generator having its rotor driven by said rotatable member and its rotor winding energized by a suitable source of alternating current, synchro receiving means having primary windings connected to the stator windings of said synchro generator and having a group of secondary windings equal in number to one-half said given number, said secondary windings being fixedly positioned with different orientations of the electrical axes thereof, and discriminator means responsive respectively to error voltages developed in said secondary windings due to the electrical relationship between the axes of said rotor and said secondary windings to provide output pulses indicative of the presence and phase of said error voltages.

5. Apparatus for indicating the rotational displacement of a rotatable member, comprising: a synchro generator having its rotor driven by said rotatable member and its rotor winding energized by a suitable source of alternating current, a plurality of synchro receivers having their primary windings connected to the stator windings of said synchro generator and having their secondary windings fixedly positioned with relatively different orientations of their electrical axes, and discriminator means responsive respectively to error voltages developed in said secondary windings whenever the electrical axis of said rotor winding passes through predetermined positions to provide output pulses indicative of the presence and phase of said error voltages.

6. Apparatus for indicating the rotational displacement of a rotatable member, comprising: a synchro generator having its rotor driven by said rotatable member and its rotor winding energized by a suitable source of alternating current, a given number of synchro receivers having their primary windings connected to the stator windings of said synchro generator and having their secondary windings fixedly positioned with their electrical axes spaced apart by an angle equal to 360° divided by said given number, and discriminator means responsive respectively to error voltages developed in said secondary windings whenever the electrical axis of said rotor winding passes through predetermined positions to provide output pulses indicative of the presence and phase of said error voltages.

7. Apparatus for indicating the rotational displacement of a rotatable member in increments equal to 360° divided by a given number, comprising: a synchro generator having its rotor driven by said rotatable member and its rotor winding energized by a suitable source of alternating current; a plurality of synchro receivers equal in number to said given number, said receivers having their primary windings connected to the stator windings of said synchro generator and having their secondary windings fixedly positioned with relatively different orientations of their electrical axes; and discriminator means responsive respectively to error voltages developed in said secondary windings whenever the electrical axis of said rotor winding passes through predetermined positions to provide output pulses indicative of the presence and phase of said error voltages.

8. Apparatus for indicating the rotational displacement of a rotatable member in increments equal to 360° divided by a given even number, comprising: a synchro generator having its rotor driven by said rotatable member and its rotor winding energized by a suitable source of alternating current; a plurality of synchro receivers equal in number to one-half said given number, said receivers having their primary windings connected to the stator windings of said synchro generator and having their secondary windings fixedly positioned with different orientations of the electrical axes thereof; and discriminator means responsive respectively to error voltages developed in said secondary windings as a result of the relative position of said rotor to provide output pulses indicative of the presence and phase of said error voltages.

9. Apparatus for indicating the rotational displacement of a rotatable member, comprising: a synchro generator having its rotor driven by said rotatable member and its rotor winding energized by a suitable source of alternating current, synchro receiving means having primary windings connected to the stator windings of said synchro generator and having a plurality of secondary windings fixedly positioned with relatively different orientations of their electrical axes, discriminator means responsive respectively to error voltages developed in said secondary windings whenever the electrical axis of said rotor winding passes through predetermined positions to provide output pulses indicative of the presence and phase of said error voltages, and means responsive to said output pulses for providing a digital indication of the rotational displacement of said rotatable member.

10. Apparatus for indicating the rotational displacement of a rotatable member, comprising: a synchro generator having its rotor driven by said rotatable member and its rotor winding energized by a suitable source of alternating current; synchro receiving means having primary windings connected to the stator windings of said synchro generator and having a plurality of secondary windings fixedly positioned with relatively different orientations of their electrical axes; discriminator means responsive respectively to error voltages developed in said secondary windings whenever the electrical axis of said rotor winding passes through predetermined positions to provide output pulses indicative of the presence and phase of said error voltages; and means responsive to said output pulses for providing a digital indication of the rotational displacement of said rotatable member, said means comprising a register having a plurality of stages.

11. Apparatus for indicating the rotational displacement of a rotatable member in increments equal to 360° divided by a given number, comprising: a synchro generator having its rotor driven by said rotatable member and its rotor winding energized by a suitable source of alternating current; synchro receiving means having primary windings connected to the stator windings of said synchro generator and having a plurality of secondary windings fixedly positioned with relatively different orientations of their electrical axes; discriminator means associated with each said secondary winding and responsive to error voltages developed therein whenever the electrical axis of said rotor winding passes through predetermined positions to provide output pulses indicative of the presence and phase of said error voltages; and means responsive to said output pulses for providing a digital indication of the rotational displacement of said rotatable member, said means comprising a register having a number of stages equal to said given number.

12. Apparatus for indicating the rotational displacement of a rotatable member in increments equal to 360° divided by a given number, comprising: a synchro generator having its rotor driven by said rotatable member and its rotor winding energized by a suitable source of alternating current; synchro receiving means having primary windings connected to the stator windings of said synchro generator and having a group of secondary windings equal in number to said given number, said secondary windings being fixedly positioned with relatively different orientations of their electrical axes; a separate discriminator means associated with each said secondary winding and responsive to error voltages developed therein whenever the electrical axis of said rotor winding passes through predetermined positions to provide output pulses indicative of the presence and phase of said error voltages; and means responsive to said output pulses for providing a digital indication of the rotational displacement of said rotatable member, said means comprising a register having a number of stages equal to said given number and said stages being respectively responsive to said discriminator means.

13. Apparatus for indicating the rotational displacement of a rotatable member in increments equal to 360° divided by a given even number, comprising: a synchro generator having its rotor driven by said rotatable member and its rotor winding energized by a suitable source of alternating current; synchro receiving means having primary windings connected to the stator windings of said synchro generator and having a group of secondary windings equal in number to one-half said given number, said secondary windings being fixedly positioned with different orientations of the electrical axes thereof; discriminator means associated with each said secondary winding and responsive to error voltages developed therein in response to the relative position of said rotor to provide output pulses indicative of the presence and phase of said error voltages; and means responsive to said output pulses for providing a digital indication of the rotational displacement of said rotatable member, said means comprising a register having said given number of stages in its first order and each of said discriminator means being associated with two of said stages.

14. Apparatus for indicating the rotational displacement of a rotatable member, comprising: a synchro generator having its rotor driven by said rotatable member and its rotor winding energized by a suitable source of alternating current, synchro receiving means having primary windings connected to the stator windings of said synchro generator and having a plurality of secondary windings fixedly positioned with relatively different orientations of their electrical axes, separate discriminator means responsive respectively to error voltages developed in each of said secondary windings whenever the electrical axis of said rotor winding passes through predetermined positions to provide output pulses indicative of the presence and phase of said error voltages, means responsive to said output pulses for providing a digital indication of the rotational displacement of said rotatable member, and means for recording said digital indication.

15. Apparatus for indicating rotational displacements of a rotatable member, comprising: a synchro generator having its rotor driven by said rotatable member and its rotor winding energized by a suitable source of alternating current, synchro receiving means having primary windings connected to the stator windings of said synchro generator and having a plurality of secondary windings fixedly positioned with relatively different orientations of their electrical axes, separate discriminator means responsive respectively to error voltages developed in each of said secondary windings whenever the electrical axis of said rotor winding passes through predetermined positions to provide output pulses indicative of the presence and phase of said error voltages, means responsive to said output pulses for providing digital indications of said rotational displacements of said rotatable member, and means for individually recording selected ones of said digital indications.

16. Apparatus for indicating rotational displacements of a rotating member, comprising: a synchro generator having its rotor driven by said rotatable member and its rotor windings energized by a suitable source of alternating current; synchro receiving means having primary windings connected to the stator windings of said synchro generator and having a plurality of secondary windings fixedly positioned with relatively different orientations of their electrical axes; discriminator means responsive respectively to error voltages developed in said secondary windings whenever the electrical axis of said rotor winding passes through predetermined positions to provide output pulses indicative of the presence and phase of said error voltages; means responsive to said output pulses for providing digital indications of said rotational displacements of said rotating member; means for recording selected ones of said digital indications; and means for rendering said last-mentioned means non-responsive during those portions of each revolution of said rotating member when said digital indications are changing.

17. Apparatus for indicating rotational displacements of a rotating member, comprising: a synchro generator having its rotor driven by said rotatable member and its rotor winding energized by a suitable source of alternating current; synchro receiving means having primary windings connected to the stator windings of said synchro generator and having a plurality of secondary windings fixedly positioned with relatively different orientations of their electrical axes; discriminator means responsive respectively to error voltages developed in said secondary windings whenever the electrical axis of said rotor winding passes through predetermined positions to provide output pulses indicative of the presence and phase of said error voltages; means responsive to said output pulses for providing a digital indication of said rotational displacements of said rotating member, said means comprising a register having a plurality of stages in its first order, each stage comprising a pair of trigger circuits; and means for recording selected settings of said register, said means being operatively connected to one of said trigger circuits in each stage to render it non-responsive during changes in the setting of said register.

18. Apparatus for indicating rotational displacements of a rotating member, comprising: a synchro generator having its rotor driven by said rotatable member and its rotor winding energized by a suitable source of alternating current; synchro receiving means having primary windings connected to the stator windings of said synchro generator and having a plurality of secondary windings fixedly positioned with relatively different orientations of their electrical axes; discriminator means responsive respectively to error voltages developed in said secondary windings whenever the electrical axis of said rotor winding passes through predetermined positions to provide output pulses indicative of the presence and phase of said error voltages; means responsive to said output pulses for providing a digital indication of said rotational displacements of said rotating member, said means comprising a register having a plurality of stages in its first order, each stage comprising a bi-stable trigger circuit and a self-restoring trigger circuit; and means for recording selected settings of said register, said means being operatively connected to said self-restoring trigger circuits to render it non-responsive during changes in the setting of said register.

19. A register for electrical pulses, comprising: a series of trigger circuits each having independently two conditions of stability; means in each circuit responsive to an electrical pulse to destroy one of said conditions of stability; common input means for applying a succession of electrical initiating pulses to all of said circuits, each pulse acting to destroy said first condition of stability in any of said circuits in which said first condition of stability exists without affecting the second condition of stability in the other circuits; means for adapting said register selectively for forward or reverse operation; connections for applying a potential variation produced by destruction of said first condition of stability in any such circuit to the next succeeding circuit to establish said first condition of stability in said succeeding circuit when said register is adapted for forward operation and to the next preceding circuit to establish said first condition of stability in said preceding circuit when said register is adapted for reverse operation; and carry means for producing a carry when said register passes from its highest-valued to its lowest-valued digit during forward operation and from its lowest-valued to its highest-valued digit during reverse operation.

20. In combination, a plurality of signal sources having individual outputs and a common output, a bi-stable trigger circuit adapted in response to said individual outputs to assume respectively one status or the other, a self-restoring trigger circuit responsive to said common output, and plural means adapted in response to the restoration of said self-restoring trigger circuit and respectively under the control of the outputs of said bi-stable trigger circuit selectively to provide an output signal.

References Cited in the file of this patent

UNITED STATES PATENTS

| | | |
|---|---|---|
| 2,088,613 | Satterlee | Aug. 3, 1937 |
| 2,184,843 | Kramar | Dec. 26, 1939 |
| 2,227,474 | Weathers | Jan. 7, 1941 |
| 2,363,941 | Busignies | Nov. 28, 1944 |
| 2,420,590 | Everhart | May 13, 1947 |
| 2,462,275 | Morton et al. | Feb. 22, 1949 |
| 2,529,666 | Sands | Nov. 14, 1950 |
| 2,533,739 | Mumma | Dec. 12, 1950 |
| 2,537,427 | Seid et al. | Jan. 9, 1951 |
| 2,556,556 | Schmitt et al. | June 12, 1951 |
| 2,585,630 | Crosman | Feb. 12, 1952 |
| 2,641,522 | King | June 9, 1953 |
| 2,656,106 | Stabler | Oct. 20, 1953 |
| 2,680,241 | Gridley | June 1, 1954 |
| 2,691,100 | Moody et al. | Oct. 5, 1954 |
| 2,692,727 | Hobbs et al. | Oct. 26, 1954 |
| 2,697,551 | Rench | Dec. 21, 1954 |
| 2,700,502 | Hamilton et al. | Jan. 25, 1955 |
| 2,730,698 | Daniels et al. | Jan. 10, 1956 |

FOREIGN PATENTS

| | | |
|---|---|---|
| 366,548 | Germany | Jan. 8, 1923 |
| 975,941 | France | Oct. 17, 1950 |